June 12, 1956  W. H. ADAMS  2,749,753
TEMPERATURE MEASURING DEVICE
Filed May 11, 1953
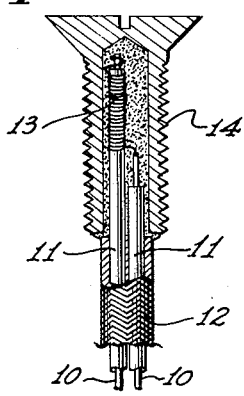
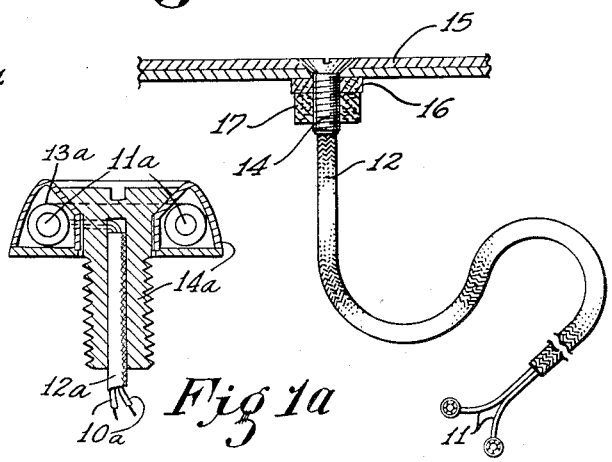
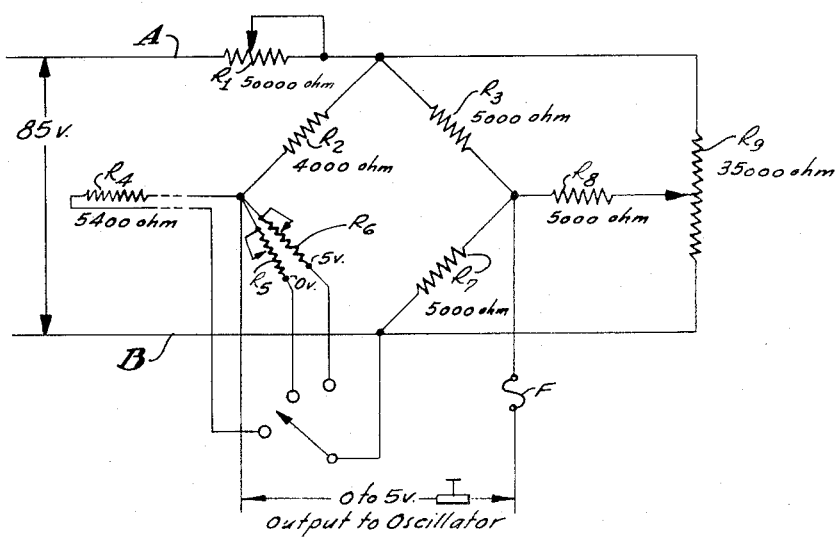
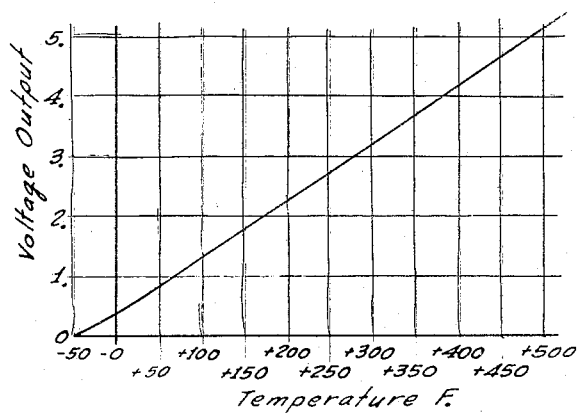
INVENTOR:
William H. Adams
By Herbert E. Metcalf
His Patent Attorney United States Patent Office 2,749,753
Patented June 12, 1956

2,749,753

TEMPERATURE MEASURING DEVICE

William H. Adams, Manhattan Beach, Calif., assignor to Northrop Aircraft, Inc., Hawthorne, Calif., a corporation of California Application May 11, 1953, Serial No. 354,243

1 Claim. (Cl. 73—362)

This invention relates to temperature measuring instruments and particularly to such instruments of the type utilizing a wire resistance temperature responsive element and adapted for inclusion in a Wheatstone bridge circuit.

Many instruments of the above type are known but all are lacking in satisfactory performance under the conditions required of the instrument of this invention, such conditions including great accuracy; linearity in reading over a wide range of temperature; capability of relatively high output voltage without the use of amplifiers, while drawing little current; easy but accurate adjustment; and capability of installation at any point at which temperature measurements are to be taken.

Among the most generally used electrically operated temperature measuring instruments are:

Thermocouples included in an electrical circuit—have a very low output at low temperature readings, requiring the output to be amplified, and thus are liable to inaccuracies caused by the tendency of amplifiers to drift. In addition, thermocouples require cold junction reference points which are not required in the temperature measuring means of this invention.

Resistance bulbs—have a very low output, requiring amplification with its attendant inaccuracy, and the power input cannot be increased sufficiently to obtain sufficiently high output without overheating the bulbs. Further, these instruments are not adjustable but are made for particular limited ranges of temperature.

Thermistors—used in temperature measuring circuits, have a negative temperature resistance coefficient, that is, the resistance decreases as the temperature increases. Thermistors have a low output requiring amplification and input power cannot be increased without danger of destroying the thermistor since the rise in temperature due to an increased input voltage would decrease the resistance of the thermistor, thus increasing the flow of current through it until destruction resulted. The output of these devices is also non-linear.

It is an object of this invention to provide a novel temperature sensing element or probe adapted for incorporation in a novel electrical circuit to produce an instrument capable of use over a wide temperature range, and adjustable so that a predetermined range of output voltage may be obtained for the range of temperature to which the circuit is adjusted.

Another object of the invention is to provide a novel temperature sensing probe construction adapted for inclusion in a variety of circuits whereby various measurements may be made, indicating conditions causing variations in temperature, such for instance as the rate of flow of a fluid over a surface with consequent temperature changes of the surface caused by the friction of the fluid flowing thereover.

A further object is to provide temperature responsive means included in electrical circuits which does not need amplifying means to provide a voltage output sufficient to be utilized in telemetering applications.

A still further object of the invention is to provide temperature measuring apparatus of high accuracy and rapid response which does not require the use of vacuum tubes.

Yet another object of the invention is to provide a small, rugged, and sensitive temperature responsive device.

A further object of the invention is to provide a temperature responsive element which may be incorporated in standard AN fittings such as washers, screws, and the like enabling accurate temperature readings to be taken in locations in which it is difficult to use previously existing equipment satisfactorily.

Still further objects and features of the invention will hereinafter appear from the following description read in conjunction with the accompanying drawings.

The invention, briefly stated, consists in a temperature probe of such small dimensions and strength of construction that it may be positioned without difficulty at any point at which temperature readings are to be taken, the probe being incorporated in a circuit provided with a relatively high input voltage and providing a sufficiently high output voltage to be used without amplification for telemetering the readings. The circuit and probe are arranged so that they may be adjusted before installation to give accurate readings over wide ranges of temperature, such as from −70° F. to +650° F. and may also be readily checked after installation to ensure that the accuracy of the readings of the instrument has not been impaired.

In the drawings:

Figure 1 is a longitudinal section, drawn on an enlarged scale showing a typical construction of the temperature sensitive probe utilized in the apparatus of the invention.

Figure 1a is a section similar to Figure 1 showing the temperature sensitive probe arranged in a hollow ring.

Figure 2 is a cross section, approximately full size, through a typical location for the temperature sensitive probe having the temperature sensitive element incorporated in a screw stud mounted in the skin of an air vehicle in order to measure the temperature of the skin.

Figure 3 is a diagram of a typical electrical circuit in which a probe of the invention is incorporated.

Figure 4 is a curve showing variation of output of the instrument with change in temperature; it will be noted that the curve is practically straight line due to the rapid transfer of heat from the specimen to the temperature responsive element of the device.

Referring now to the drawings:

In Figure 1 the numeral 10 indicates the leads of the heat sensitive element shown by way of example, the leads being preferably insulated by a plastic coating 11 and enclosed in a protective sheath 12 of braided wire.

The heat sensitive element is provided by a length of insulated fine wire 13 of about 50 feet in length of an alloy of 70% Ni and 30% Fe sold commercially under the trade name "Balco" and characterized by the linearity of its temperature voltage curve over a wide range. One end of the wire is bared and silver soldered to a short exposed end of one lead and the wire is wound around the insulated lead, which acts as a support for the coil, the other end of the fine wire coil is then soldered to the exposed end of the other lead to produce a concentrated coil of very small length. The coil of wire is then coated with insulation to a minimum thickness in liquid or paste form thus producing an element adapted to be positioned in close proximity to the area of the temperature of which is to be measured. The element is then mounted in an enclosing member, which in the embodiment illustrated in Figure 2 may be flat head machine screw 14 which has been drilled to receive the coil, the insulating medium being then set.

The coil is retained in the machine screw or other enclosing member by any suitable insulating cement. Such a cement should meet predetermined electrical requirements after exposure to high humidity or water immersion, should have a precisely known temperature reaction in terms of temperature and time, with the ability to withstand both low and high temperatures, and should have good mechanical strength under vibration. A cement having the required characteristics may be selected from one, or by combining more than one, of various preparations commercially available. It should be noted that by the described construction the amount of metal encasing the temperature sensitive coil is reduced to a minimum as is the thickness of the cement used to fill the space between the coil and the wall of the bore of the small fastening member in which the coil is mounted.

The completed probe is then carefully calibrated for its temperature voltage curve over a range of the extent expected to be encountered in use.

In Figure 2, the screw 14 is shown inserted in a hole drilled in the metal skin of a high speed airplane 15 and is retained therein by a washer 16 and nut 17 of a suitable plastic such as nylon.

It will be noted that there is little or no metal in proximity to the coil of the probe which could cause heat losses by conduction, and that the temperature sensitive coil is in close proximity to the part the temperature of which is to be observed since the cement coating is very thin.

In the event that it is desired to encase the element in a washer-like container; the washer may be grooved, and the heat or temperature responsive element bent into an arcuate form positioned in the groove, the open side of which is then covered with metal foil silver soldered thereover. Alternately the container may be stamped out of sheet metal to provide a body in the form of a hollow ring open at the back, the open side being closed by a flat ring of thin metal silver soldered to the body after the heat sensitive element has been placed in position. The latter form of enclosing member is shown in Figure 1a with the same numerals as used in Figure 1 with the addition of letter a.

The probe is connected in a suitable bridge-type circuit, that shown in Figure 3 incorporating features basic to the novel circuit.

In the circuit, A and B indicate main leads between which a suitable source of electrical power is connected, supplying for instance 85 volts D. C. with the circuit constants shown.

In order to be able to adjust the circuit so that a range of 0 to 5 volts output will be obtained over the expected range of temperature and with a probe wound to a known value of resistance, in the circuit shown the probe resistance being 5400 ohms, an adjustment to set the recording instrument such as a V. T. V. M. (not shown) to read 5 volts at the high end of the temperature range is provided by the adjustable resistance $R_1$ which has a value of 50,000 ohms.

A separate adjustable resistance $R_9$ is provided in the line C across leads A and B to adjust the instrument to give a reading of zero at the low end of the temperature range, the value of $R_9$ in the circuit shown being 35,000 ohms.

Fixed resistances are positioned in the fixed arms of the circuit, $R_2$ being 4000 ohms, $R_3$ 5000 ohms, $R_7$ 5000 ohms, and a resistance $R_8$ of 5000 ohms inserted in series with the arm of variable resistance $R_9$.

Resistances $R_5$ and $R_6$ which may be adjustable are of a value depending on the range of temperature to be measured and are provided so that the accuracy of reading of the instrument after installation may be readily calibrated against the curve obtained from the instrument before installation.

Preferably, to guard against damage to the instrument by a surge of voltage should the probe become open, a "Thyrite" resistor T is connected across the output from the instrument, and a fuse F is positioned in an output lead. The resistor is a commercially available protective device having the characteristic of decrease of resistance with increase of voltage. In the event of a sudden increase of voltage the resistance of T instantly drops to a value passing sufficient current to blow the fuse F.

Tests of the instrument in use have given an output linear within about 5%, and stability under normal conditions for a period up to 90 days is within about 1%.

Resistance of the leads in the circuit shown is of no consequence, thus enabling the probe to be positioned at various points at which temperature is to be measured without having to move the equipment operated by the output of the instrument, such as oscillator the frequency of which is controlled by the output of the instrument and which transmits the signals to be received by distant ground equipment.

The maximum current drain of the instrument is very small, being about 7 ma. at the low end of the temperature scale.

The temperature sensing element or probe is very rugged notwithstanding the small diameter wire used therein which is of the order of one mil and may be readily designed to withstand pressures of 5000 lbs. per square inch.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

Electrically operated temperature measuring means of the kind described and comprising: a concentrated multilayer coil of wire; insulated leads connected to the ends of said coil on one of which leads the coil is wound and supported; an enclosing member of minimum thickness and of heat conductive material recessed to receive said coil and adapted to be secured at any point at which temperature readings are to be taken; a layer of electrical insulating medium of minimum thickness securing said coil in said member; a Wheatstone bridge-type circuit in which said coil is connected as one arm thereof; means for supplying high voltage to said circuit, means for adjusting the output of said circuit to zero at the lower limit of a range of temperature to which said coil is subjected, means for adjusting the output of said circuit to a predetermined value at the maximum temperature to which the coil is subjected, the output of said circuit being utilized to operate equipment recording the temperatures measured by said instrument; and an element the resistance of which decreases with increase of voltage arranged between the output leads of the device and a fuse arranged in one of said leads.

References Cited in the file of this patent

UNITED STATES PATENTS

| 845,413   | Haagn      | Feb. 26, 1907 |
| --------- | ---------- | ------------- |
| 1,460,530 | Brown et al. | July 3, 1923 |
| 1,715,374 | Krueger    | June 4, 1929  |
| 1,867,870 | Baker et al. | July 19, 1932 |
| 2,113,610 | Bacon      | Apr. 12, 1938 |
| 2,181,981 | Smith      | Dec. 5, 1939  |
| 2,182,554 | Galle      | Dec. 5, 1939  |
| 2,285,118 | Jones      | June 2, 1942  |
| 2,365,706 | Keinath    | Dec. 26, 1944 |
| 2,463,984 | Lederer    | Mar. 8, 1949  |
| 2,680,583 | Davis      | June 8, 1954  |

FOREIGN PATENTS

| 251,291 | Great Britain | July 22, 1926 |